United States Patent [19]

Fang et al.

[11] Patent Number: 5,292,241
[45] Date of Patent: Mar. 8, 1994

[54] APPARATUS FOR DRESSING OF BLOW-MOLDED ARTICLES IN A STRAND

[75] Inventors: Jin-Liou Fang, San Jose, Calif.; James E. Maly, Ridgefield, Conn.

[73] Assignee: Kraft General Foods, Inc., Northfield, Ill.

[21] Appl. No.: 955,628

[22] Filed: Oct. 1, 1992

[51] Int. Cl.$^5$ .............................................. B29C 49/72
[52] U.S. Cl. .................................. 425/289; 225/100; 264/161; 264/536; 425/527; 425/806
[58] Field of Search ............... 425/806, 527, 531, 289, 425/306, 307, 363; 264/536, 161, 532, 533; 225/971, 100

[56] References Cited

U.S. PATENT DOCUMENTS

| | | | |
|---|---|---|---|
| 3,010,630 | 11/1961 | Lach et al. | 225/100 |
| 3,479,690 | 11/1969 | Hagen | 425/307 |
| 3,507,429 | 4/1970 | Cunningham et al. | 225/100 |
| 3,695,109 | 10/1972 | Uhlig | 425/289 |
| 3,724,980 | 4/1973 | Lassmann et al. | 425/102 |
| 3,977,585 | 8/1976 | Sagorski | 425/806 |
| 3,986,807 | 10/1976 | Takegami et al. | 425/307 |
| 3,994,651 | 11/1976 | Kamibayashi | 425/297 |
| 4,017,243 | 4/1977 | Lindsay | 425/306 |
| 4,340,342 | 7/1982 | Kim | 425/72 R |
| 4,370,124 | 1/1983 | Buja | 425/556 |
| 4,445,406 | 5/1984 | Thatcher | 264/161 |
| 4,529,114 | 7/1985 | Casper et al. | 225/100 |
| 4,731,008 | 3/1988 | Hayashi et al. | 425/335 |
| 4,865,675 | 9/1989 | Yamamoto et al. | 156/164 |
| 5,076,452 | 12/1991 | Hashimoto | 215/1 A |
| 5,118,276 | 6/1992 | Hashimoto | 264/536 |

OTHER PUBLICATIONS

TGS, Rotary New Drink, Tokyo Glass Seiki Co., Ltd. no date.

*Primary Examiner*—Jay H. Woo
*Assistant Examiner*—Duane S. Smith
*Attorney, Agent, or Firm*—Thomas R. Savoie

[57] ABSTRACT

A dresser apparatus is provided for a strand of blow-molded articles interconnected by shorter flashings. A first pair of first rollers and a second pair of second rollers are of the gear type and are mounted for rotation to define pinching planes therebetween along which the strand is directed. The second rollers are relatively spaced to engage the articles and flashings passing therebetween, and are spaced from the first rollers such that the second rollers engage each flashing or article while a succeeding article or flashing is being engaged by the first rollers. A second moving device rotates the second rollers at a predetermined speed which is greater than the speed of the first rollers. Thus, each flashing or article is pulled from the succeeding article or flashing. A final pair of final rollers is mounted for rotation and defines a final pinching plane rotated (turned) with respect to the second pinching plane so that deformation of the articles caused by engagement with the first and second rollers is compensated for by passage through the final rollers. The dresser apparatus may include a third pair of third rollers spaced from the second rollers by a distance longer than the flashings but shorter than the articles so that the separated flashings fall between the second and third rollers while the articles are passed from the second to the third rollers.

15 Claims, 2 Drawing Sheets

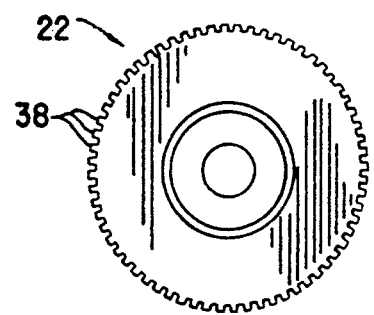
Fig.3
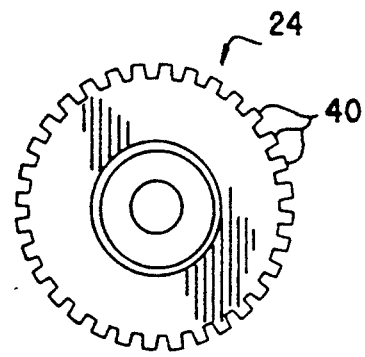
Fig.4
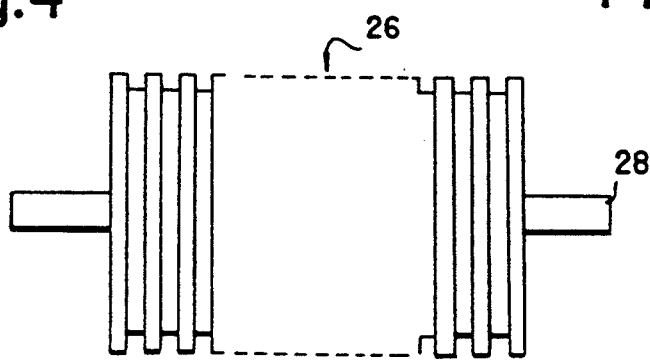
Fig.5
Fig.6
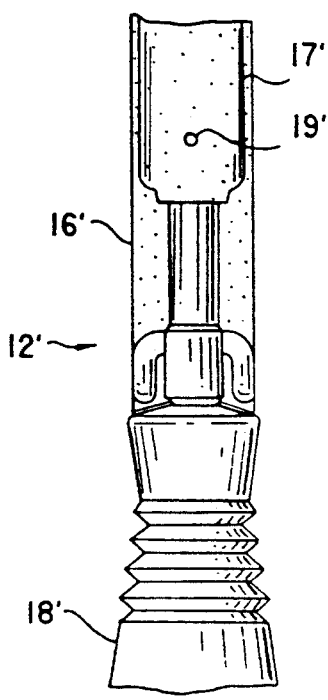
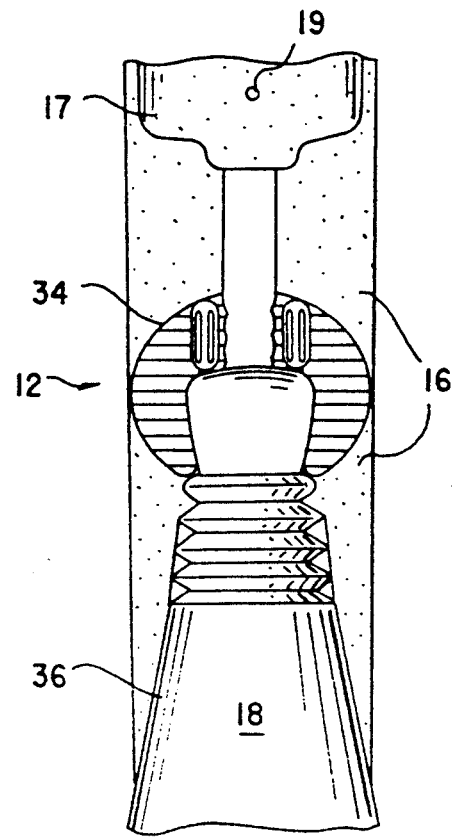
Fig.7 ns,292,241

APPARATUS FOR DRESSING OF BLOW-MOLDED ARTICLES IN A STRAND

FIELD OF THE INVENTION

The present invention relates generally to the dressing of blow-molded articles in a strand, and more particularly to the dressing of plastic articles connected by flashings using rollers without producing deformed articles.

BACKGROUND OF THE INVENTION

In the production of plastic (e.g., low-density polyethylene resin) articles such as disclosed in U.S. Pat. No. 5,076,452 (and partially shown in FIG. 6 herein), a TGS Rotary Blow Molding Machine by Tokyo Glass Seiki Co., Ltd. of Tokyo, Japan was used. This machine was used to form the bottles in a strand with flashings therebetween. On exiting the machine and associated cooler, the bottles were dressed by separating the shorter flashings from the longer bottles using a system of three pairs of longitudinally grooved rollers driven at predetermined speeds.

In the system, a first pair of first rollers would receive the strand therebetween with a certain compressive force caused by the clearance between the first rollers. A second pair of second rollers would then receive the strand therebetween with a certain compressive force caused by the clearance between the second rollers. By driving the second rollers at a greater speed than the first rollers, the second rollers would then successively pull the flashing or bottle caught therebetween from the succeeding bottle or flashing caught between the first rollers. A vertically-adjustable platform is positioned between the first and second rollers to prevent bottles from tipping or dropping in advance of the second rollers.

From the second rollers, the now separated flashings or bottles would be directed toward a third pair of third rollers. However, as the bottles were longer than the flashings, the third rollers were positioned from the second rollers by a distance such that the flashings would fall therebetween while the bottles would be received between the third rollers. In this manner, the flashings were separated from the bottles, and the bottles were sent forward by the third rollers to be filled. The operation of such a blow-molding machine and dressing rollers is also disclosed in U.S. Pat. No. 5,118,276 by Kentaro Hashimoto.

While the disclosed dresser system was satisfactory for use with the noted bottles, the dresser system was not satisfactory at all for an advanced bottle design having a twist-off top which is safe for children. This advanced bottle design is disclosed in commonly-assigned U.S Pat. No. 5,188,250 (and partially shown in FIG. 7) which is hereby incorporated by reference. In particular, and as explained in greater detail subsequently, such a dresser system was found to produce severely deformed bottles or unsatisfactory separation.

SUMMARY OF THE INVENTION

In accordance with the present invention, a dresser apparatus is provided for a strand of blow-molded articles such as bottles. The blow-molded articles of the strand are interconnected by flashings shorter than the articles, and these flashings must be separated or trimmed from the articles. The dresser apparatus includes a pair of first rollers mounted for rotation and defining a first pinching plane therebetween along which the strand is directed. This pair of first rollers are relatively spaced to engage the articles and flashings passing therebetween, and a first moving means is provided for rotating at least one of the first rollers at a predetermined speed.

A pair of second rollers is then mounted for rotation adjacent the first pair. The second rollers define a second pinching plane generally parallel to the first pinching plane and between which second rollers the strand is directed after passing between the pair of first rollers. The pair of second rollers are relatively spaced to engage the articles and flashings passing therebetween, and are spaced from the first pair of rollers such that the second pair of rollers engage (a) each flashing while a succeeding article is being engaged by the first pair of first rollers and (b) each article while a succeeding flashing is still engaged by the first pair of rollers. A second moving means rotates at least one of the second rollers at a predetermined speed which is greater than the speed of the at least one of the first rollers. Thus, each flashing is pulled from the succeeding article by the second rollers as the succeeding article is held by the first pair of rollers, and each article is pulled from the succeeding flashing by the second rollers as the succeeding flashing is held by the first pair of rollers.

A final pair of final rollers is then mounted for rotation and defines a final pinching plane rotated (turned) with respect to the second pinching plane to which the articles from the second pair of rollers are directed. A final moving means rotates at least one of the final rollers at a predetermined speed at least equal to that of the at least one of the second rollers so that deformation of the articles caused by engagement with the first and second rollers is compensated for by passage through the final rollers.

In a preferred embodiment, the dresser apparatus further includes a third pair of rollers mounted for rotation and defining a third pinching plane generally parallel to the second pinching plane and between which third rollers the articles are directed after passing between the second pair of second rollers. The third pair of rollers is relatively spaced to engage the articles passing therebetween and is spaced from the second pair of rollers by a distance longer than the flashings but shorter than the articles. Thus, the separated flashings fall between the second and third pairs of rollers while the articles are passed from the second to the third pair of rollers. A third moving means is also provided for moving at least one of the third rollers at a predetermined speed at least equal to the speed of the at least one second roller such that the articles are smoothly received between the third rollers from the second pair of second rollers and are passed to the final rollers.

In a preferred embodiment, the final pinching plane is rotated about 90° with respect to the second pinching plane. In addition, the first and second rollers are of a gear type with longitudinal surface grooves. The size of the gear members of the rollers may be varied but need to provide sufficient grip to the articles and flashings. According to the embodiment shown in the drawings (FIGS. 3 and 4) the size of gear members of the first rollers is smaller than a size of gear members of the second rollers. Each of the final rollers is either a smooth surfaced roller or a longitudinally grooved roller, and each of the third rollers may be a circumferentially grooved roller.

In a preferred embodiment, the strand is directed into the first pair of rollers along a straight travelling axis. Then, the first, second, third, and final pinching planes all include this travelling axis. In addition, the first, second and third pinching planes are preferably horizontal and the final pinching plane is thus vertical.

Also in accordance with the present invention, the dresser apparatus includes the first, second and third pairs of rollers as mentioned above, with the first and second rollers being of a gear type with longitudinal surface grooves in order to provide sufficient holding of the articles and flashings therebetween. Preferably, a size of gear members of the first rollers is smaller than a size of gear members of the second rollers, and each of the third rollers is a circumferentially grooved roller. The final rollers mentioned above are also provided.

The present invention further includes a method for dressing a strand of blow-molded articles interconnected by flashings shorter than the articles which flashings are to be separated from the articles. The method includes the steps of delivering the strand to the first pair of rollers which are appropriately spaced and rotated as indicated above, delivering the strand from between the first pair of rollers to a second pair of rollers which are appropriately spaced relative to one another and to the first pair of rollers and rotated as indicated above, and finally delivering the articles separated from the flashings to the final pair of rollers which are mounted for rotation so as to define a final pinching plane rotated with respect to the second pinching plane and rotated as indicated above. With this method, the deformation of the articles caused by passage between the first and second rollers is compensated for by passage between the final rollers.

In the preferred method, a third pair of rollers as described above are also provided to separate the flashings, which fall between the second and third pairs of rollers, from the articles which are then passed to the final rollers.

It is an object of the present invention to separate flashings from articles and provide finished articles which are not substantially deformed.

It is also an object of the present invention to positively grip the articles and flashings with the rollers so that they are always separated.

Other features, objects and advantages of the present invention are stated in or apparent from detailed descriptions of presently preferred embodiments of the invention found hereinbelow.

BRIEF DESCRIPTION OF THE DRAWINGS

FIG. 3 is a longitudinal side elevation view in greater detail of the first rollers depicted in FIG. 1.

FIG. 4 is a longitudinal side elevation view in greater detail of the second rollers depicted in FIG. 1.

FIG. 5 is a lateral side elevation view in greater detail of the third rollers depicted in FIG. 1.

FIG. 6 is a top longitudinal view of a portion of a stand for a first article.

FIG. 7 is a top longitudinal view of a portion of a stand for a second article depicted in FIG. 1.

DETAILED DESCRIPTION OF THE PREFERRED EMBODIMENTS

Figure 1:
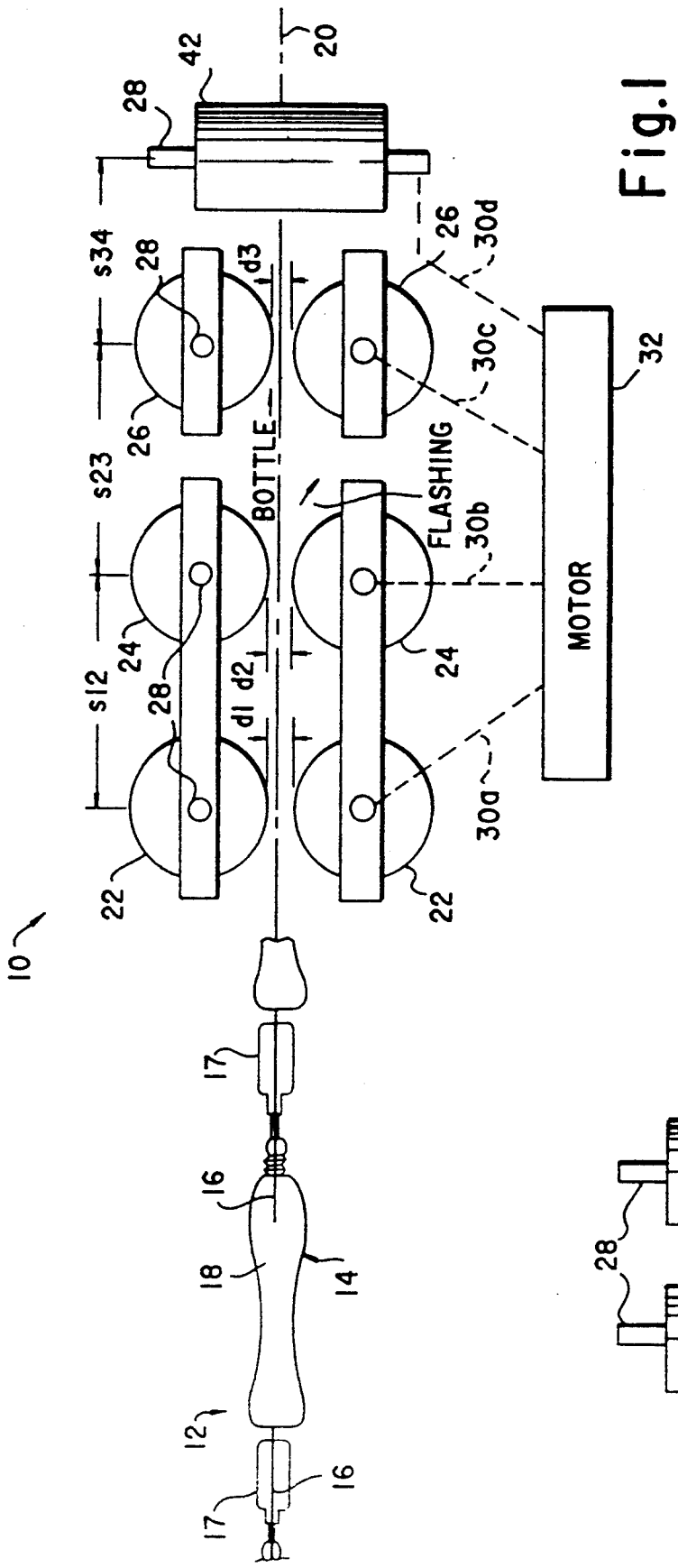
FIG. 1 is a schematic longitudinal side elevation view of the dresser apparatus of the present invention.

With reference now to the drawings in which like numerals represent like elements throughout the several views, a schematic representation of a dresser apparatus 10 is depicted in FIG. 1. Dresser apparatus 10 is used for dressing a strand 12 of blow-molded articles 14 which are interconnected by flashings 16 (shown stippled for clarity in FIGS. 6 and 7) having bubbles 17. Each bubble 17 is in communication with succeeding article 14 and has a blow hole 19 through which air is passed during the blow-molding process. It will be appreciated that articles 14 are to be separated from flashings 16 by dresser apparatus 10. In particular, dresser apparatus 10 is particularly adapted to separate flashings 16 from blow-molded bottles 18 as mentioned above and as partially depicted in FIG. 7. In order to appreciate the advantages of dresser apparatus 10, reference will be made later to bottle 18' and flashing 16' having a bubble 17' of a prior strand 12'.

In a manner similar to the prior art dresser mentioned above, dresser apparatus 10 includes a travelling axis 20 coaxial with a longitudinal axis of articles 14 along which strand 12 is directed from the blow-molding machine and which is preferably horizontal. Strand 12 is first received by a first pair of first rollers 22 which define a first horizontal pinching or nipping plane therebetween. The first pinching plane includes traveling axis 20 and extends equidistantly from first rollers 22, horizontally along traveling axis 20 and perpendicularly out of the figure plane of FIG. 1. First rollers 22 are spaced from one another by a first distance d1. Spaced from first rollers 22 by a separation s12 is a second pair of second rollers 24 which define a second pinching plane extending equidistantly therebetween (and coplanar with the first pinching plane). Second rollers 24 are spaced from one another by a second distance d2. Spaced from second rollers 24 by a separation s23 is a third pair of third rollers 26 which define a third pinching plane therebetween which is coplanar with the first and second pinching planes. Third rollers 26 are spaced from one another by a third distance d3, and it will be appreciated that third rollers 26 are circumferentially grooved rollers as shown in FIG. 5.

At least one of each of first rollers 22, second rollers 24 and third rollers 26 are driven in rotation in a forward direction about axles 28 by respective moving means 30a, 30b, and 30c. Moving means 30a is particularly designed to rotate first roller 22 at a predetermined speed equal to that necessary to take up strand 12 between first rollers 22 as strand 12 is discharged from the blow-molding machine (a rate of discharge is of the TGS Machine is 50–60 bottles per minute) and associated cooler. Moving means 30b is particularly designed to rotate second roller 24 at a speed which is greater than that of first roller 22. As will be appreciated later, moving means 30c rotates third roller 26 at some speed which can be greater or lesser than that of second roller 24, but which is preferably the same for convenience. While moving means 30a–c have been schematically depicted, it will be appreciated by those of ordinary skill in the art that moving means 30a–c could include a single motor 32 as depicted which is suitably geared and/or connected to the rollers by moving means 30a–c to provide the desired speeds of rotation. Alternatively, two or more motors could be provided which are suitably connected to one or more rollers to provide the necessary speeds of rotation.

As described so far, dresser apparatus 10 is similar to the dresser system for the TGS Machine described above and as used with strand 12' shown partially in FIG. 6. This prior art dresser system had first rollers and second rollers configured as circumferentially grooved rollers, the same as third roller 26 depicted in FIG. 5. It will thus be appreciated that as strand 12' was fed to the first rollers, the first rollers successively engaged bubbles 17' and bottles 18'. From the first rollers, strand 12' was then fed between the second rollers. As the second rollers were rotated at a greater speed than the first rollers, the engagement of the second rollers with a bubble 17' while the succeeding bottle 18' was still held between the first rollers caused all of flashing 16' to be pulled from the top end of the succeeding bottle 18'. Next and similarly, the subsequent engagement of the second rollers with the succeeding bottle 18' while a succeeding bubble 17' was still held between the first rollers caused all of the succeeding bottle 18' to be pulled from the downstream end of the succeeding flashing 16'. In this manner, it was thus possible to quickly and easily separate bottles 18' and flashings 16' from one another.

After separation, both flashings 16' and bottles 18' were directed by the second rollers toward the third rollers. However, due to the separation s23 between the second rollers and the third rollers which is greater than the length of flashings 16' but shorter than the length of bottles 18', flashings 16' fell out of the second and third pinching planes and between the second rollers and the third rollers as shown schematically by the arrow in dresser apparatus 10 while bottles 18' were passed along the second and third pinching planes and thus received between the third rollers and passed to a filling machine.

While the prior art dresser system worked sufficiently for bottles 18', it will be appreciated that bottles 18' had a joint area (line) with flashings 16' which was relatively easy to break and thus it was easy to separate flashings 16' from bottles 18'. However, as indicated above, the prior art dresser system was not sufficient for the advanced bottle design with enlarged twist off top as depicted in FIG. 7. In particular, it will be appreciated that flashing 16 extends around twist off top 34 of bottle 18 and longitudinally along neck 36. Because of this shape of bottle 18 and flashing 16, there is a considerably greater joint area (line) and flashing 16 is substantially harder to separate from bottle 18 using the prior art dresser system described above.

When the prior art dresser system as described above was used with bottle 18, it was found that the flashings 16 were not separated from bottles 18 due to the extra force required for pulling flashings 16 from bottles 18. In order to increase the pulling force, the separation distances d1 and d2 for the first rollers and the second rollers were reduced to achieve a better holding of the bubbles 17 and bottles 18 therebetween. In particular, for a bottle 18 (or 18') having a maximum diameter of about 1.85" (4.7 cm), the separation distances d1 and d2 for bottle 18' of about 0.43" (11 mm) had to be reduced to about 0.118" (3 mm) for separation distance d1 and about 0.236" (6 mm) for separation distance d2. Unfortunately, while this did result in the separation of flashings 16 from bottles 18, bottles 18 were squeezed so hard (flattened due to the small separation distances d1 and d2) by the first and second rollers that all of such bottles 18 were severely deformed by this squeezing and would not be processed by a sorting machine for bottles 18.

In order to produce good (not deformed or only slightly deformed) bottles 18, first rollers 22 and second rollers 24 of dresser apparatus 10 of the present invention are of a gear type with longitudinal surface grooves to increase the holding force of these pairs of rollers 22 and 24. In particular, one of first rollers 22 is depicted in FIG. 3 in elevation to show the various gear members 38 which extend longitudinally across the peripheral surface of first roller 22. Similarly, one of second rollers 24 is depicted in FIG. 4 in elevation to show the various gear members 40 which extend longitudinally across the peripheral surface of second roller 24.

With the present invention, it has been found that where rollers 22 and 24 are made of urethane (60 shore A durometer), gear members 38 having a square dimension (radial height and angular length) of $\frac{1}{8}$" and gear members 40 having a square dimension of $\frac{1}{4}$" are satisfactory. With these gear type rollers 22 and 24, it has also been found that the separation distance d1 should then be about 0.19" while the separation distance d2 should be about 0.29". This is larger than that which could be used with the prior art circumferentially grooved rollers, and thus this helps to reduce the flattening of bottles 18 required.

In addition, dresser apparatus of the present invention further includes a fourth or final pair of final rollers 42 which are spaced from third rollers 26 by a separation s34 and which define a final pinching plane therebetween. Final rollers 42 are spaced from one another by a final distance d4. From FIGS. 1 and 2, it will be appreciated that while the final pinching plane also includes travelling axis 20 like the other pinching planes, the final pinching plane is rotated or turned 90° with respect to the other pinching planes. This final pinching plane is thus vertical and hence parallel to the figure plane of FIG. 1. Thus, final rollers 42 are mounted for rotation about vertical axes. A final moving means 30d is then provided for rotating at least one of final rollers 42 at a predetermined speed which is at least equal to that of second rollers 24. As with moving means 30a-c, moving means 30d can include a separate motor and associated drive elements, or moving means 30d can share the same motor and other elements with moving means 30a-c.

Figure 2:
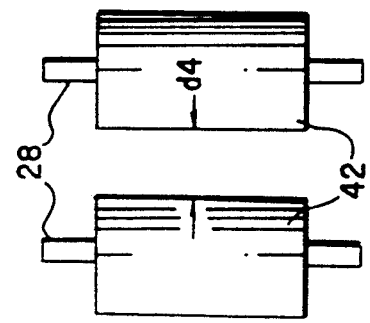
FIG. 2 is a lateral side elevation view of the final rollers depicted in FIG. 1.

Final rollers 42 are depicted in FIGS. 1 and 2 as having a smooth outer surface. Such an outer surface has proven satisfactory, but it has also been found that final rollers can also be of the circumferentially grooved type and thus be the same as third rollers 26 depicted in FIG. 5. The providing of final rollers 42 with a central concavity to match the shape of bottles 18 was also tried, but it was found that the straight shape produced more satisfactory results.

In use, bottles 18 which are received by third rollers 26 are then passed directly to final rollers 42 along travelling axis 20. Such bottles 18 are typically deformed (flattened) horizontally after passage through the horizontal pinching planes of rollers 22, 24, and 26. Thus, final rollers 42 act to compensate for this horizontal deformation by providing a vertical (counter) deformation. With first and second distances d1 and d2 as mentioned above and with third distance d3 set at 1.5" (3.81 cm), a separation distance d4 of 1.25" (3.175 cm) has been satisfactory.

In use, the present invention provides a method of operation as follows. Strand 12 is delivered along travelling axis 20 and between first rollers 22. First rollers 22 are spaced at separation distance d1 as noted above so as to pinch bottles 18 and bubbles 17 therebetween as at least one of first rollers 22 is rotated at a predetermined speed by first moving means 30a. From first rollers 22, strand 12 is delivered between second rollers 24. Second rollers 24 are spaced at separation distance d2 as noted above so as to pinch bottles 28 and bubbles 17 therebetween, and second rollers 24 are separated from first rollers 22 by separation s12 so that second rollers pinch each bubble 17 or bottle 18 as a successive bottle 18 or bubble 17 is pinched by first rollers 22. Thus, as at least one of second rollers 24 is rotated at a predetermined speed greater than the speed of first rollers 22, each flashing 16 (including bubble 17) is pulled from the succeeding bottle 18 and each subsequent bottle 18 is pulled from a succeeding flashing 16.

The separated bottles 18 and flashings 16 are then individually delivered toward third rollers 26. However, as third rollers 26 are separated from second rollers 24 by separation s23 which is greater than a length of flashings 16 but shorter than bottles 18, flashings 16 fall down and away from third rollers 26 while bottles 18 are passed to third rollers 26 as shown by the arrows. At least one of third rollers 26 is rotated at a predetermined speed at least equal to about the speed of the second roller. Bottles 18, which are at this point flattened (deformed) in the horizontal plane because of the pinching action of rollers 22, 24, and 26 are then delivered to final rollers 42. At least one of final rollers 42 is rotated at about speed equal to that of third rollers 42. As final rollers are mounted at some angle (preferably 90°) so that the pinching plane thereof is rotated or turned with respect to those of rollers 22, 24, and 26, the flattening of bottles 18 is thus compensated for (reversed) so that bottles 18 are ejected from final rollers 42 substantially non deformed (or at most slightly deformed, which is still acceptable for further processing).

It will be appreciated that the embodiment of the present invention described above is primarily a retrofit for the existing prior art dresser system as also described above and provided with the blow-molding apparatus. Therefore, it is also considered that the present invention could be configured in another preferred embodiment without third rollers 26. Instead, it would be possible to deliver bottles 18 directly from second rollers 24 to final rollers 42, with final rollers 42 then separated from second rollers 24 at some suitable separation so that flashings 16 would be separated from bottles 18 in the same manner as with third rollers 26.

Thus, while the present invention has been described with respect to exemplary embodiments thereof, it will be understood by those of ordinary skill in the art that variations and modifications can be effected within the scope and spirit of the invention.

What is claimed is:

1. A dresser apparatus for a strand of blow-molded articles interconnected by flashings shorter than the articles which flashings are to be separated from the articles, said dresser apparatus comprising:
   a first pair of first rollers mounted for rotation and defining a first pinching plane equidistantly therebetween and along which said first pinching plane the strand is directed, said first pair of first rollers being relatively spaced to laterally engage and hence deform toward said first pinching plane the articles and flashings passing therebetween;
   a first moving means for rotating at least one of said first rollers at a first speed;
   a second pair of second rollers mounted for rotation, defining a second pinching plane equidistantly therebetween which is generally parallel to said first pinching plane, and between which said second rollers the strand is directed after passing between said first rollers, said second pair of second rollers being relatively spaced to laterally engage and hence deform toward said second pinching plane the articles and flashings passing therebetween and being spaced from said first pair of first rollers such that said second pair of second rollers engage a) each flashing while a succeeding article is being engaged by said first pair of first rollers and b) each article while a succeeding flashing is being engaged by said first pair of first rollers;
   a second moving means for rotating at least one of said second rollers at a second speed which is greater than said first speed such that a) each flashings pulled from the succeeding article by said second rollers as the succeeding article is held by said first pair of first rollers and b) each article is pulled from the succeeding flashing by said second rollers as the succeeding flashing is held by said first pair of first rollers;
   a final pair of final rollers mounted for rotation, final pinching plane is rotated relative to a longitudinal axis for the article and with respect to said second pinching plane, and between which said final rollers the articles from said second pair of second rollers are directed so that lateral deformation of the articles toward said first and second pinching planes caused by passage between said first and second rollers is compensated for by passage of the articles between said final rollers which laterally deform the articles toward said final pinching plane which is rotated relative to said first and second pinching planes; and
   a final moving means for rotating at least one of said final rollers at a final speed at least equal to said second speed.

2. A dresser apparatus as claimed in claim 1 and further including (a) a third pair of third rollers mounted for rotation, defining a third pinching plane equidistantly therebetween and generally parallel to said second pinching plane, and between which said third rollers the articles are directed after passing between said second pair of second rollers, said third pair of third rollers being relatively spaced to laterally engage the articles passing therebetween and being spaced from said second pair of second rollers by a distance longer than the flashings but shorter than the articles such that the separated flashings fall between said second and third pairs of rollers while the articles are passed from said second to said third pair of rollers and (b) a third moving means for moving at least one of said third rollers at a third speed at least equal to said second speed such that the articles are received between said third rollers from said second pair of second rollers and are passed to said final rollers.

3. A dresser apparatus as claimed in claim 2 wherein said final pinching plane is rotated about 90° with respect to sad second pinching plane.

4. A dresser apparatus as claimed in claim 3 wherein said first and second rollers are of a gear type with uniform longitudinal surface grooves with respect to the rotational axis of the rollers.

5. A dresser apparatus as claimed in claim 4 wherein a size of gear members of said first rollers is smaller than a size of gear members of said second rollers.

6. A dresser apparatus as claimed in claim 4 wherein the strand is directed into said first pair of first rollers along a straight travelling axis, and wherein said first, second, third, and final pinching planes all include the travelling axis.

7. A dresser apparatus as claimed in claim 6 wherein said first, second and third pinching planes are horizontal and said final pinching plane is vertical.

8. A dresser apparatus as claimed in claim 7 wherein each of said final rollers is a smooth surfaced roller and each of said third rollers is a uniformly circumferentially grooved roller.

9. A dresser apparatus as claimed in claim 7 wherein each of said final and third rollers is a uniformly circumferentially grooved roller.

10. A dresser apparatus as claimed in claim 1 wherein said final pinching plane is rotated about 90° with respect to said second pinching plane.

11. A dresser apparatus as claimed in claim 10 wherein said first and second rollers are of a gear type with uniform longitudinal surface grooves with respect to the rotational axis of the rollers.

12. A dresser apparatus as claimed in claim 11 wherein a size of gear members of said first rollers is smaller than a size of gear members of said second rollers.

13. A dresser apparatus as claimed in claim 11 wherein the strand is directed into said first pair of first rollers along a straight travelling axis, and wherein said first, second, third, and final pinching planes all include the travelling axis.

14. A dresser apparatus as claimed in claim 13 wherein said first, second and third pinching planes are horizontal and said final pinching plane is vertical.

15. A dresser apparatus as claimed in claim 1 wherein each said final roller rotates about a rotational axis thereof and has a circumferential surface portion which engages the articles, said surface portion having a radial cross section which is circular.

* * * * *